United States Patent [19]

Adams

[11] Patent Number: 4,474,840
[45] Date of Patent: Oct. 2, 1984

[54] METHOD OF SELECTIVE BONDING OF TEXTILE MATERIALS

[75] Inventor: Ronald W. Adams, Auburn, Me.

[73] Assignee: The Gates Corporation, Denver, Colo.

[21] Appl. No.: 451,032

[22] Filed: Dec. 20, 1982

Related U.S. Application Data

[62] Division of Ser. No. 296,886, Aug. 27, 1981, abandoned.

[51] Int. Cl.³ .......................... B32B 1/04; B32B 3/00; B32B 3/10
[52] U.S. Cl. ........................................ 428/71; 428/76; 428/157; 428/158; 428/177; 428/190; 428/192; 428/304.4
[58] Field of Search ............... 428/319.1, 71, 76, 157, 428/177, 188–190, 192–194, 196, 246, 288, 296, 304.4, 316.6, 158, 159, 160

[56] References Cited

U.S. PATENT DOCUMENTS

| | | | |
|---|---|---|---|
| 2,797,179 | 6/1957 | Reynolds et al. | 264/252 |
| 2,853,399 | 9/1958 | Shoults | 428/440 |
| 3,164,655 | 1/1965 | Howard et al. | 156/245 |
| 3,301,257 | 1/1967 | Crowe, Jr. et al. | 428/316.6 |
| 3,562,052 | 2/1971 | Mertejcek et al. | 156/245 |
| 3,647,588 | 3/1972 | Greig | 428/319.1 |
| 3,713,936 | 1/1973 | Ramsey | 156/242 |
| 4,186,235 | 1/1980 | Bramwell | 428/286 |
| 4,199,635 | 4/1980 | Parker | 156/62.2 |
| 4,262,051 | 4/1981 | Welz et al. | 428/296 |
| 4,338,366 | 7/1982 | Evans et al. | 428/304.4 |
| 4,377,609 | 3/1983 | Bartoli et al. | 428/71 |
| 4,411,944 | 10/1983 | Moore | 428/192 |

FOREIGN PATENT DOCUMENTS 1052632 12/1966 United Kingdom ............... 156/245

Primary Examiner—William J. Van Balen
Attorney, Agent, or Firm—Raymond Fink; H. W. Oberg, Jr.; C. H. Castleman, Jr.

[57] ABSTRACT

A cushioned panel is provided together with a process of molding it. A non-woven fabric having an outer layer composed of polypropylene or other thermoplastic fibers is heated to the melting point of the fibers. It is inserted into a mold having a decorative surface fabric and a piece of foam cushioning therein. The mold is designed so that the edges of the male and female mold halves compress the molten non-woven substrate and the surface fabric forcing the molten surface of the substrate into the interstices of the surface fabric. A mechanical bond is formed upon cooling.

2 Claims, 3 Drawing Figures

METHOD OF SELECTIVE BONDING OF TEXTILE MATERIALS

This is a division of Ser. No. 296,886 filed Aug. 27, 1981 now abandoned.

Background of the Invention

1. Field of the Invention

The field of the invention relates to a cushioned panel and a method for molding it.

2. Brief Description of the Prior Art

The bonding of textiles to various substrates such as textiles, paper, plastics and metals has been accomplished through dielectric bonding, spray or heat activated adhesives, sewing, and heating and pressing.

In U.S. Pat. No. 3,562,052, an interior lining for motor vehicles is made by sprinkling a needle fleece with polyethylene powder and heating the powder to its melting point. Upon cooling, the fleece fibers will be anchored in the polyethylene layer. The resulting lining may be heated and placed in a die to shape it in a desired form.

U.S. Pat. No. 3,713,936 discloses a laminate including a fabric layer secured to a non-woven mat by means of an adhesive material, the mat being secured to a thermoplastic material by a heat fusing step. The laminate is then placed in a mold of an appropriate shape.

U.S. Pat. No. 4,186,235 discloses a method wherein a non-woven cloth is positioned against the article-defining surface of a mold and a thermoplastic material is then introduced. The material may be a foam. Heat and pressure are applied to fuse the cloth and material.

U.S. Pat. No. 4,199,635 discloses a method of producing a decorative laminate panel such as used in the interior of automobiles. An unconsolidated layer of synthetic fibers and a layer of melt fibers are applied to a continuously advancing web of melt fibers. The three layers are then needled to form a composite web. A batt is needled to the composite web and a decorative fabric is applied to the layer of melt fibers. Heat and pressure are then applied.

SUMMARY OF THE INVENTION

The invention is directed to a method of bonding two textiles materials to each other as they are being molded. The product obtained in accordance with the method may be used as a trim panel inserted in a door of an automobile. Other applications would also be possible. A unique mold configuration is also employed which allows two materials to be bonded in selected areas and permits the incorporation of a cushioning material between the two materials.

In accordance with the method, a first fabric including at least an outer layer of thermoplastic fibers is heated to a point in excess of its melting point. The first fabric is inserted within a mold having a second fabric therein. A piece of foam of appropriate size and shape is positioned between the two fabrics. The mold is designed so that the edges of the male and female halves thereof compress the juxtaposed portions of the fabrics causing the molten surface of the first fabric to penetrate within the interstices of the second fabric. Upon cooling within the mold, a mechanical bond is formed between portions of the two fabrics. The resulting structure is a panel having cushioning material locked between two fabrics. No cushioning material is visible from either side of the panel.

The method according to the invention is advantageous in that no powders, films, or adhesive need to be used. No secondary operation is required to attach a fabric to a molded substrate. The bonding of the two fabrics will withstand relatively high temperatures for long periods of time.

DETAILED DESCRIPTION OF THE INVENTION

Figure 1:
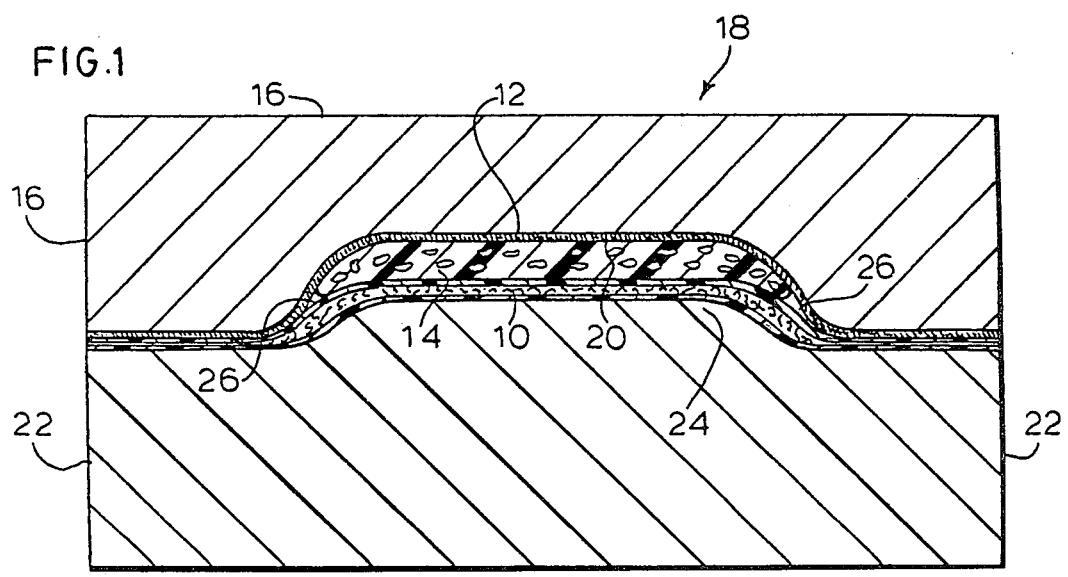
FIG. 1 is a sectional view of cushioning material positioned between a pair of fabrics in a mold.

A first non-woven fabric 10 similar in construction to the material described in U.S. Pat. No. 4,199,635 is provided. The fabric 10 has outer layers composed of polypropylene or other thermoplastic fibers. Unlike the patented structure, an outer decorative surface is not yet provided. A layer of batting has also been omitted from the structure shown herein.

A decorative knit, woven or non-woven surface fabric 12 is also provided. The surface fabric 12 has a textile backing. A die cut piece of foam 14 is laid over the surface fabric 12 when the latter is positioned over the female portion 16 of a mold 18. The textile backing of the surface fabric contacts the foam. The first non-woven fabric 10 is then placed over the opposite side of the foam 14 sandwiching it between the two fabrics. As shown in the drawing, the foam is laid over the surface fabric in such a manner that the outer perimeter of the cavity 20 of the female portion 16 of the mold is not covered thereby. Decorative blades may be incorporated in the surface defining the cavity.

The mold 18 is designed so that the edges of the male 22 and female 16 mold halves compress the non-woven substrate and the surface fabric into an area approximately 0.040 inches thick. Prior to the compression, the first non-woven fabric 10 is heated to a point beyond the melting point of its outer layers. If the outer layers are composed of polypropylene fibers, heat should be applied until the temperature of the fibers exceeds 390° F.

Figure 2:
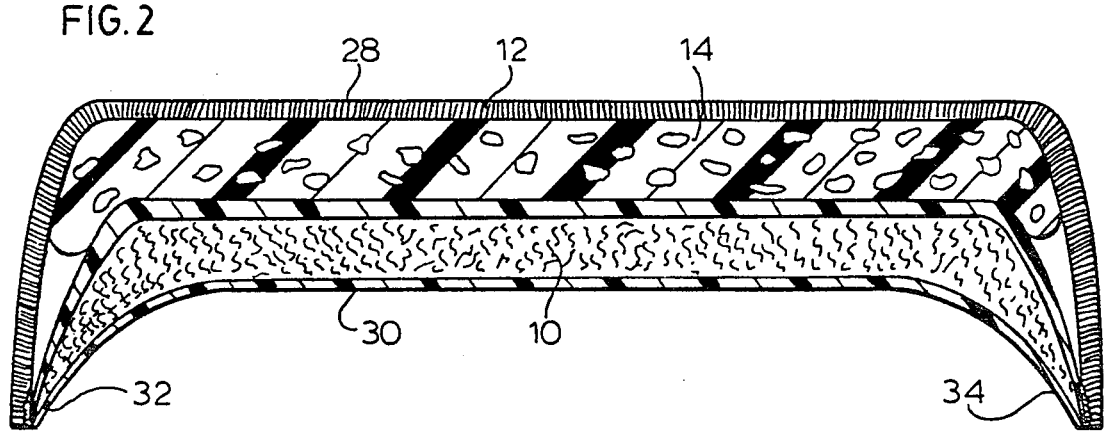
FIG. 2 is a sectional view of a product produced in accordance with the invention.
Figure 3:
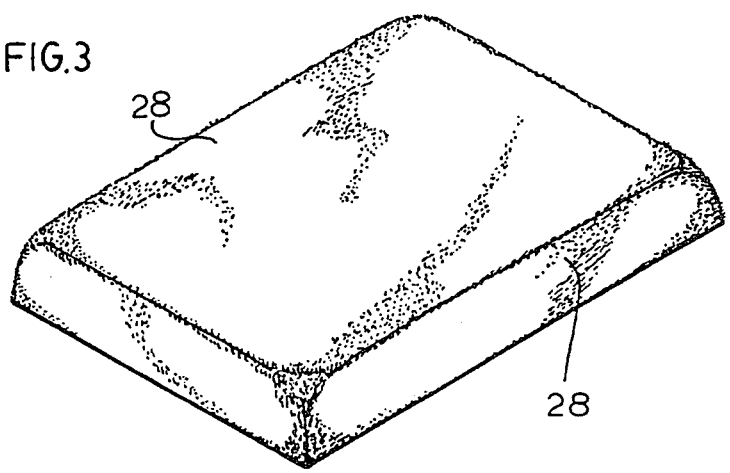
FIG. 3 is a perspective view of the product shown in FIG. 2.

The molten non-woven fabric 10 and the surface fabric 12 are compressed within the mold as shown in FIG. 1. A symmetrical space is provided between the surface of the cavity 20 and the projecting portion 24 of the male half of the mold 18 to accomodate the foam 14. High pressure is not applied to the foam during the molding operation. The pressure exerted by the mold halves forces the molten surface of fabric 10 into the interstices of the surface fabric 12. Upon cooling, a mechanical bond is formed between the two fabrics, particularly in the tapered areas 26 which may be referred to as the "pinching gaps" where pressure is relatively high. The molded part is then die cut or cut by other mechanical means from the full sheet (not shown) and is ready for use. A structure as shown in FIGS. 2-3 may be obtained. Other configurations would of course be possible.

The illustrated structure includes substantially flat opposing surfaces 28, 30 and a pair of projecting portions 32, 34 extending from the bottom surface. Due to the shape of the mold, the thickness of the molten non-woven fabric 10 is significantly compressed in the area of the projecting portions 32, 34 providing excellent bonding between it and the decorative surface fabric 12. The foam does not extend between the fabrics in the bonding area and only a portion of it is compressed in the pinching gap 26. This compression substantially locks the foam in place between the two fabrics 10, 12. The decorative surface fabric 12 defines three contiguous surfaces of the panel. The fourth surface 30 is defined by the first fabric 10.

What is claimed is:

1. A decorative laminate panel, which comprises;
   a first, non-woven fabric of thermoplastic fibers having at least one surface formed by the melting under pressure and re-solidification by by cooling of said fibers on the surface of said first fabric;
   a second fabric having an edge portion bonded to an edge portion of said surface of said first fabric through said melting and re-solidification of the fibers, said surface of said first fabric at least partially penetrating within said second fabric, creating a mechanical bond therewith, said second fabric including an outer decorative surface, said decorative surface defining first, second and third sides of said panel, and a surface of said second fabric defining a fourth side of said panel opposite to said first side, said second and third sides joining said first and fourth sides, respectively; and
   a layer of foam positioned between and contacting with said first and second fabrics.

2. A panel as described in claim 1 having in cross section a body portion and two symmetrical projecting portions forming a generally U-shaped configuration, said foam piece being positioned between said fabrics for the length of said body portion, said fabrics being bonded to each other near the outermost portions of said projecting portions, said first fabric having a progressively decreasing thickness in the direction of the outermost portions of said projecting portions, said foam piece having opposing edge portions extending partially within said projecting portions between said fabrics, said edge portions being compressed.

* * * * *